United States Patent
Finlay et al.

(10) Patent No.: US 10,229,359 B2
(45) Date of Patent: Mar. 12, 2019

(54) OPTIMIZER PROBLEM DETERMINATION

(71) Applicant: International Business Machines Corporation, Armonk, NY (US)

(72) Inventors: Ian R. Finlay, Uxbridge (CA); Piotr Mierzejewski, Markham (CA); Nattavut Sutyanyong, Thornhill (CA); Calisto P. Zuzarte, Pickering (CA)

(73) Assignee: International Business Machines Corporation, Armonk, NY (US)

( * ) Notice: Subject to any disclaimer, the term of this patent is extended or adjusted under 35 U.S.C. 154(b) by 280 days.

(21) Appl. No.: 15/158,627

(22) Filed: May 19, 2016

(65) Prior Publication Data
US 2017/0039240 A1    Feb. 9, 2017

Related U.S. Application Data

(63) Continuation of application No. 14/820,735, filed on Aug. 7, 2015.

(51) Int. Cl.
| | |
|---|---|
| *G06N 5/00* | (2006.01) |
| *G06N 5/04* | (2006.01) |
| *G06F 17/30* | (2006.01) |
| *G06N 5/02* | (2006.01) |

(52) U.S. Cl.
CPC ....... *G06N 5/003* (2013.01); *G06F 17/30463* (2013.01); *G06N 5/02* (2013.01); *G06N 5/047* (2013.01)

(58) Field of Classification Search
None
See application file for complete search history.

(56) References Cited

U.S. PATENT DOCUMENTS

| | | | | |
|---|---|---|---|---|
| 6,985,904 | B1 * | 1/2006 | Kaluskar | G06F 17/30457 |
| 7,634,456 | B2 * | 12/2009 | Yagoub | G06F 17/30306 |
| 7,747,606 | B2 * | 6/2010 | Dageville | G06F 17/30306 |
| | | | | 707/713 |
| 7,765,200 | B2 | 7/2010 | Kandil et al. | |
| 7,840,946 | B2 | 11/2010 | Gupta et al. | |
| 7,958,113 | B2 | 6/2011 | Fan et al. | |
| 8,774,057 | B2 | 7/2014 | Barsness et al. | |
| 8,812,486 | B2 | 8/2014 | Markl et al. | |
| 8,983,934 | B2 * | 3/2015 | Ramacher | G06F 17/30306 |
| | | | | 707/721 |

(Continued)

OTHER PUBLICATIONS

Chaudhuri, Surajit et al.; "Self-Tuning Database Systems: A Decade of Progress"; 2007; VLDB '07; pp. 3-14. (Year: 2007).*

(Continued)

*Primary Examiner* — Stanley K. Hill
(74) *Attorney, Agent, or Firm* — David B. Woycechowsky; Steve Fisher-Stawinski

(57) ABSTRACT

A computer-implemented method includes receiving an artifact and a problem pattern, transforming the artifact into an abstracted artifact structure, and transforming the problem pattern into a query. The query is matched against the abstracted artifact structure. Any matched portions of the abstracted artifact structure are related back to corresponding result portions of the artifact. The corresponding result portions of the artifact are returned. The method may be embodied in a corresponding computer system or computer program product.

5 Claims, 7 Drawing Sheets

(56) References Cited

U.S. PATENT DOCUMENTS

| | | | |
|---|---|---|---|
| 9,189,522 B2* | 11/2015 | Das | G06F 17/30463 |
| 9,720,941 B2* | 8/2017 | Belknap | G06F 17/30306 |
| 9,734,200 B2* | 8/2017 | Gangloor | G06F 17/30463 |
| 2003/0061244 A1* | 3/2003 | Hirohata | G06F 17/30463 |
| 2003/0172059 A1* | 9/2003 | Andrei | G06F 17/30454 |
| 2004/0010488 A1* | 1/2004 | Chaudhuri | G06F 17/30463 |
| 2005/0097091 A1* | 5/2005 | Ramacher | G06F 17/30306 |
| 2005/0165741 A1* | 7/2005 | Gordon | G06F 17/30306 |
| 2006/0085378 A1* | 4/2006 | Raizman | G06F 17/30312 |
| 2007/0038618 A1* | 2/2007 | Kosciusko | G06F 17/30306 |
| 2009/0077016 A1* | 3/2009 | Belknap | G06F 17/30306 |
| 2009/0106306 A1* | 4/2009 | Das | G06F 17/30469 |
| 2010/0005340 A1* | 1/2010 | Belknap | G06F 11/3688 714/37 |
| 2014/0304251 A1 | 10/2014 | Bornea et al. | |

OTHER PUBLICATIONS

Agrawal, Sanjay et al.; "Automatic Physical Design Tuning: Workload as a Sequence"; 2006; SIGMOD 2006; pp. 683-694. (Year: 2006).*

Agrawal, Sanjay et al.; "Database Tuning Advisor for Microsoft SQL Server 2005: Demo"; SIGMOD 2005; pp. 930-932. (Year: 2005).*

Dagevill, Benoit et al.; "Automatic SQL Tuning in Oracle 10g"; 2004; Proceedings of the 30th VLDB Conference; pp. 1098-1109. Year: 2004).*

Finlay et al., "Optimizer Problem Determination", U.S. Appl. No. 14/820,735, filed Aug. 7, 2015, 25 pages.

IBM, "List of IBM Patents or Patent Applications Treated As Related", Appendix P, 2 pages, dated May 19, 2016.

* cited by examiner

<http://explainPlan/PlanPop/5> <http://explainPlan/PlanPred/hasOutputStreamPopNum> <http://explainPlan/PlanPop/1> .
<http://explainPlan/PlanPop/5> <http://explainPlan/PlanPred/hasPreFetch> "NONE" .
<http://explainPlan/PlanPop/5> <http://explainPlan/PlanPred/hasIOCost> "7.0"^^<http://www.w3.org/2001/XMLSchema#float> .
<http://explainPlan/PlanPop/5> <http://explainPlan/PlanPred/hasTableLockIntent> "INTENT SHARE" .
<http://explainPlan/PlanPop/5> <http://explainPlan/PlanPred/hasScanDir> "FORWARD" .
<http://explainPlan/PlanPop/5> <http://explainPlan/PlanPred/hasEstimateCardinality> "404.333"^^<http://www.w3.org/2001/XMLSchema#float> .
<http://explainPlan/PlanPop/5> <http://explainPlan/PlanPred/hasReCPUCost> "2630290.0"^^<http://www.w3.org/2001/XMLSchema#float> .
<http://explainPlan/PlanPop/5> <http://explainPlan/PlanPred/hasRowLockIntent> "SHARE (CS/RS)" .
<http://explainPlan/PlanPop/5> <http://explainPlan/PlanPred/hasJoinInputLeg> "INNER" .
<http://explainPlan/PlanPop/5> <http://explainPlan/PlanPred/hasTotalCost> "157.71"^^<http://www.w3.org/2001/XMLSchema#float> .
<http://explainPlan/PlanPop/5> <http://explainPlan/PlanPred/hasFirstRowCost> "9.1208"^^<http://www.w3.org/2001/XMLSchema#float> .
<http://explainPlan/PlanPop/5> <http://explainPlan/PlanPred/hasPopType> "TBSCAN" .
<http://explainPlan/PlanPop/5> <http://explainPlan/PlanPred/hasCPUCost> "2758890.0"^^<http://www.w3.org/2001/XMLSchema#float> .
<http://explainPlan/PlanPop/5> <http://explainPlan/PlanPred/hasReTotalCost> "105.212"^^<http://www.w3.org/2001/XMLSchema#float> .
<http://explainPlan/PlanPop/5> <http://explainPlan/PlanPred/hasEstimatedBufferpollBuffer> "7.0"^^<http://www.w3.org/2001/XMLSchema#float> .
<http://explainPlan/PlanPop/5> <http://explainPlan/PlanPred/hasMaxPages> "ALL" .
<http://explainPlan/PlanPop/5> <http://explainPlan/PlanPred/hasOrder> "FALSE" .
<http://explainPlan/PlanPop/5> <http://explainPlan/PlanPred/hasLockAvoidance> "TRUE" .
<http://explainPlan/PlanPop/5> <http://explainPlan/PlanPred/hasRelIOCost> "0.0"^^<http://www.w3.org/2001/XMLSchema#float> .
<http://explainPlan/PlanPop/5> <http://explainPlan/PlanPred/hasPopID> "5.0"^^<http://www.w3.org/2001/XMLSchema#float> .
<http://explainPlan/PlanPop/5> <http://explainPlan/PlanPred/hasInputStreamPop> <http://explainPlan/PlanBaseObject/T2> .
<http://explainPlan/PlanPop/5> <http://explainPlan/PlanPred/hasTableAccessIsolationLevel> "CURSOR STABILITY" .

FIG. 7

```
PREFIX popURI: <http://explainPlan/PlanPop/>
PREFIX baseObjURI: <http://explainPlan/PlanBaseObject/>
PREFIX predURI: <http://explainPlan/PlanPred/>
PREFIX planURI: <http://explainPlan/PlanDetails/>
    SELECT (?pop1 AS ?TOP) (?pop2 AS ?ANY2)
        WHERE {
            ?pop1 predURI:hasPopType "NLJOIN" .
            ?pop1 predURI:hasOuterInputStream ?pop2 .
            ?pop1 predURI:hasInnerInputStream ?pop3 .
            ?pop2 predURI:hasEstimateCardinality ?internalHandler1 .
            FILTER ( ?internalHandler1 > 1) .
            ?pop3 predURI:hasPopType "TBSCAN" .
            ?pop3 predURI:hasEstimateCardinality ?internalHandler2 .
        FILTER ( ?internalHandler2 > 100) .
        }   ORDER BY ?pop1
```

FIG. 8

OPTIMIZER PROBLEM DETERMINATION

BACKGROUND

The present invention relates generally to optimizer problem determination and in particular to optimization of query execution plans for relational databases.

Relational database management systems have long been central to the information economy, and the complexity of such systems has increased with the volume of data under management. At the enterprise level, major commercial relational database systems such as IBM® DB2®, Oracle® Database, and Microsoft® SQL Server® are deployed in environments where finding all available optimizations and performance enhancements becomes necessary to maintaining everyday usability of the database.

SUMMARY

A computer-implemented method includes receiving an artefact and a problem pattern, transforming the artefact into an abstracted artefact structure, and transforming the problem pattern into a query. The query is matched against the abstracted artefact structure. Any matched portions of the abstracted artefact structure are related back to corresponding result portions of the artefact. The corresponding result portions of the artefact are returned. A corresponding computer system and computer program product are also disclosed.

BRIEF DESCRIPTION OF THE DRAWINGS

FIG. 7 is a portion of an abstraction, in a resource description framework, of the query execution plan of FIG. 6, also presented as example data in accordance with at least one embodiment of the invention.

FIG. 8 is a portion of software code, in a resource description framework query language, for querying the abstracted query execution plan of FIG. 7, in accordance with at least one embodiment of the invention.

DETAILED DESCRIPTION

Figure 1:
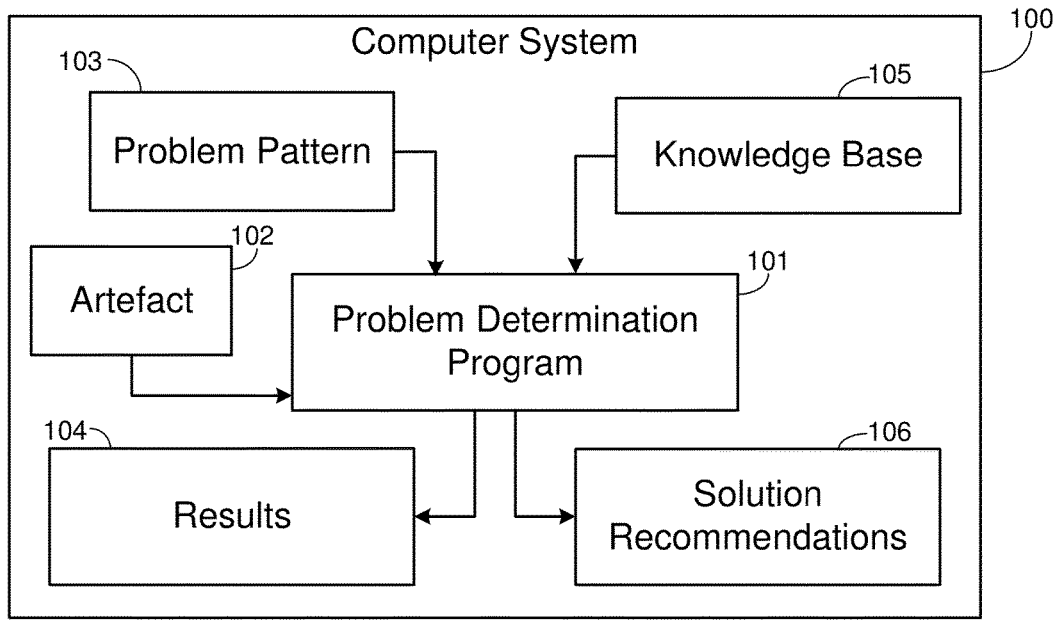
FIG. 1 is a block diagram of one embodiment of a computer system environment suitable for operation in accordance with at least one embodiment of the invention.

Referring now to the invention in more detail, FIG. 1 is a block diagram displaying an exemplary computer system environment suitable for operation of at least one embodiment of the invention. Within a computer system 100, a problem determination program 101 may receive as input an artefact 102 and a problem pattern 103. The problem determination program 101 may return results 104, which include those portions of the artefact 102 that match the problem pattern 103. Additionally, the problem determination program 101 may access a knowledge base 105, including one or more predetermined problem patterns 103 and related solution recommendations 106. The problem determination program 101 may further return those solution recommendations 106 that are applicable to the results 104.

In general, the artefact 102 may be any data to be analyzed, and the problem pattern 103 may be any pattern to be matched within the artefact 102. More particularly, the artefact 102 may be diagnostic data, for example relating to one or more computer systems. Broadly, the contemplated diagnostic data may be human-readable and intended for review by human users of the system to which the diagnostic data relates. Examples of possible artefacts 102 include log data relating to network usage, security, or software compiling, as well as software debug data or sensor data relating to some physical system external to the computer system 100. The problem pattern may correspond to any sequence of data points or interrelationships of data points that are of diagnostic interest.

Figure 2:
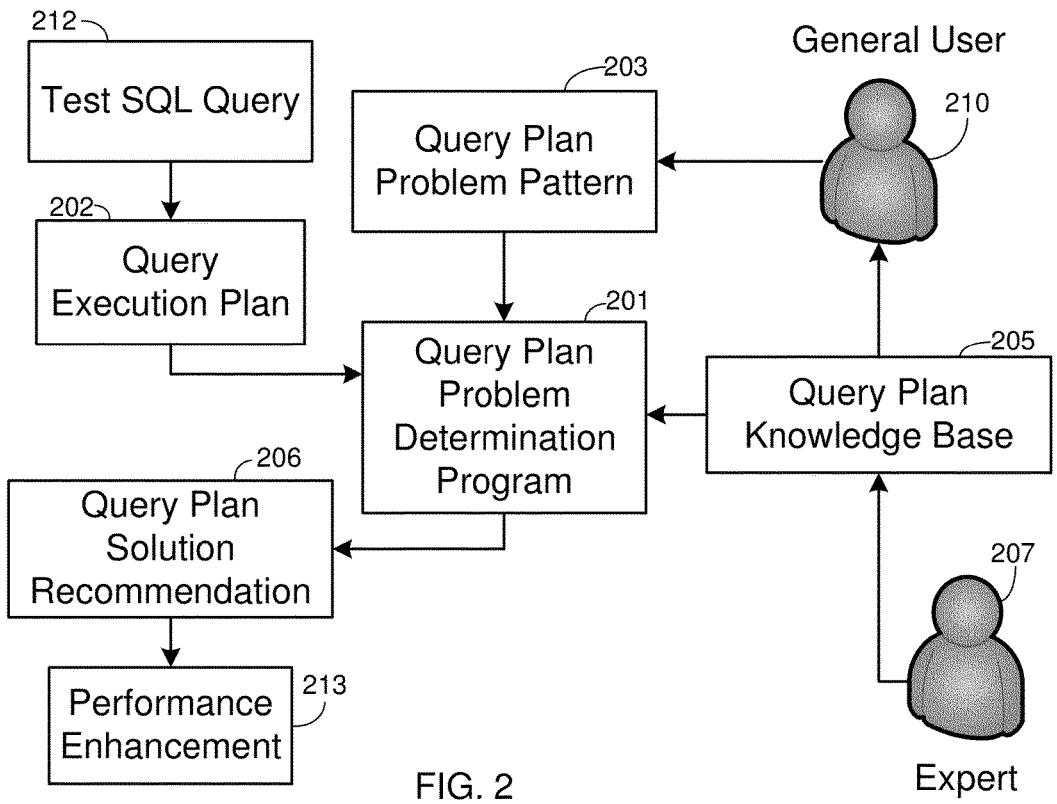
FIG. 2 is a block diagram of an operational environment in accordance with at least one embodiment of the invention.

In some embodiments, such as the embodiment depicted in FIG. 2, the artefact 102 may become a query execution plan 202 for accessing a database management system. The database management system may be a Relational DataBase Management System ("RDBMS") such as IBM® DB2®, Oracle® Database, or Microsoft® SQL Server®. The query execution plan may include a series of ordered steps, known as LOw LEvel Plan OPeratorS ("LOLEPOPS"). The LOLEPOPS may be understood, at the level of abstraction of the RDBMS user, as indivisible operations that are directly executed by the RDBMS, with each LOLEPOP carrying a stated cost. The stated cost for each LOLEPOP represents an estimate of server resources, and may be understood as being generated by the RDBMS based on a proposed query taken in view of the particular properties of the database. The overall query execution plan may likewise be machine-generated by the RDBMS, and may be understood as being already machine-optimized to include the lowest total cost LOLEPOPS attainable by the RDBMS's optimizer.

Time-costly review of the query plan by a human user may therefore be needed to further improve performance, for example where the human user seeks to improve, debug, or verify the optimizer itself. Machine optimization may likewise fail where a performance enhancement cannot be implemented directly by optimizing the proposed query as-coded, for example, using Structured Query Language ("SQL"). Examples of this include cases where the recommended performance enhancement is to index a particular table in a particular way or to alter the proposed query to generate the same result but with better performance. In this class of embodiments, the problem pattern 103 comprises a sequence of LOLEPOPS having particular properties that are interest to a user as indicative of one or more of the aforementioned problems.

FIG. 2 displays an operational environment in accordance with at least one embodiment of the invention wherein the artefact 102 becomes the query execution plan 202. In the embodiment depicted in FIG. 2, the query execution plan 202 is generated from a test SQL query 212 and received by the query plan problem determination program 201, along with the query plan problem pattern 203. The query plan problem pattern 203 may be presented by a general user 210. The general user 210 may create the query plan problem pattern 203 on his or her own, or may use a predetermined problem pattern taken from a query plan knowledge base 205.

The query plan knowledge base 205 may include one or more predetermined problem patterns related to one or more query plan solution recommendations 206. The predetermined problem patterns and related query plan solution recommendations 206 may be created by one or more experts 207. The query plan problem determination program 201 may also access the query plan knowledge base 205 and match the query plan problem pattern 203 against the one or more predetermined problem patterns in the query plan knowledge base 205. Matching the query plan problem pattern 203 against the one or more predetermined problem patterns may be accomplished by any search algorithm. Where the query plan problem determination program 201 detects a match between the query plan problem pattern 203 and the query execution plan 202, the query plan problem determination program may return the one or more query plan solution recommendations 206 for those of the one or more predetermined problem patterns that are matched. The general user 210 may apply the returned query plan solution recommendation 206, which may include one or more recommendations to engage in one or more database tuning operations, to achieve a performance enhancement 213.

In an alternative case, the query plan problem determination program 201 may, instead of taking a specific problem pattern 103 defined by the user, iterate over all of the predetermined problem patterns in the query plan knowledge base 205. Specifically, each problem pattern 103 may, in such cases, be understood as being received from the query plan knowledge base 205. In such cases, the query plan problem determination program may directly recall and return the solution recommendations for the particular problem pattern 103, if there are any results on the artefact 102. Such a technique would enable query plan checks to be routinized—a user could, with now particular knowledge or training, run a general test of all predetermined problem patterns against a given artefact 102.

Figure 3:
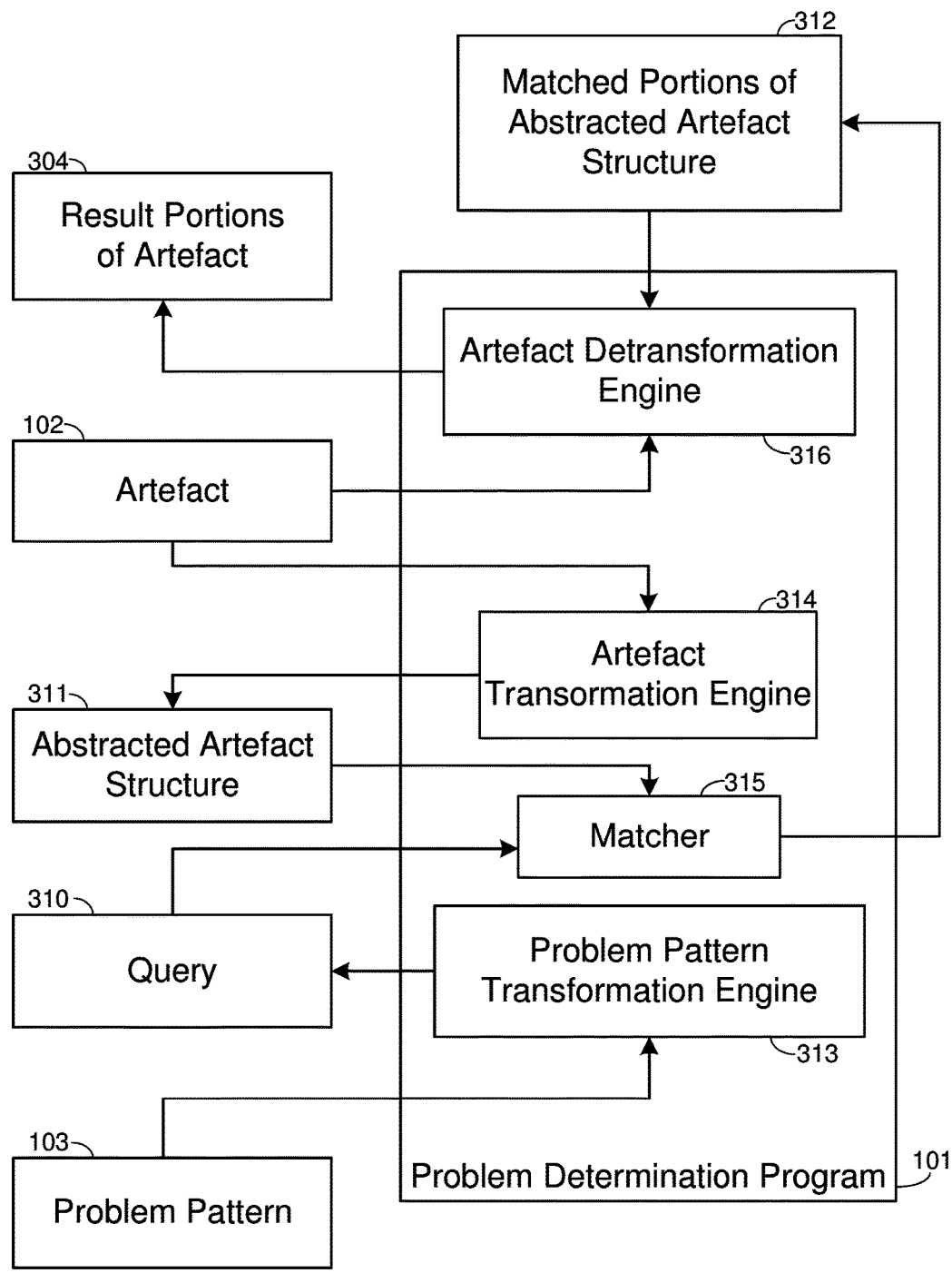
FIG. 3 is a data flow diagram in accordance with at least one embodiment of the invention.

Referring now to the data flow diagram of FIG. 3, FIG. 3 shows how data moves through the problem determination program 101, in accordance with at least one embodiment. The artefact 102 is transformed via an artefact transformation engine 314 into an abstracted artefact structure 311. The problem pattern 103 is likewise transformed, via a problem pattern transformation engine 313, into a query 310. A matcher 315 compares the query 310 with the abstracted artefact structure 311. The resulting matched portions 312 of the abstracted artefact structure 311 are related back to the original artefact 102 by an artefact detransformation engine 316, and output includes the result portions 304 of the artefact 102.

Figure 4:
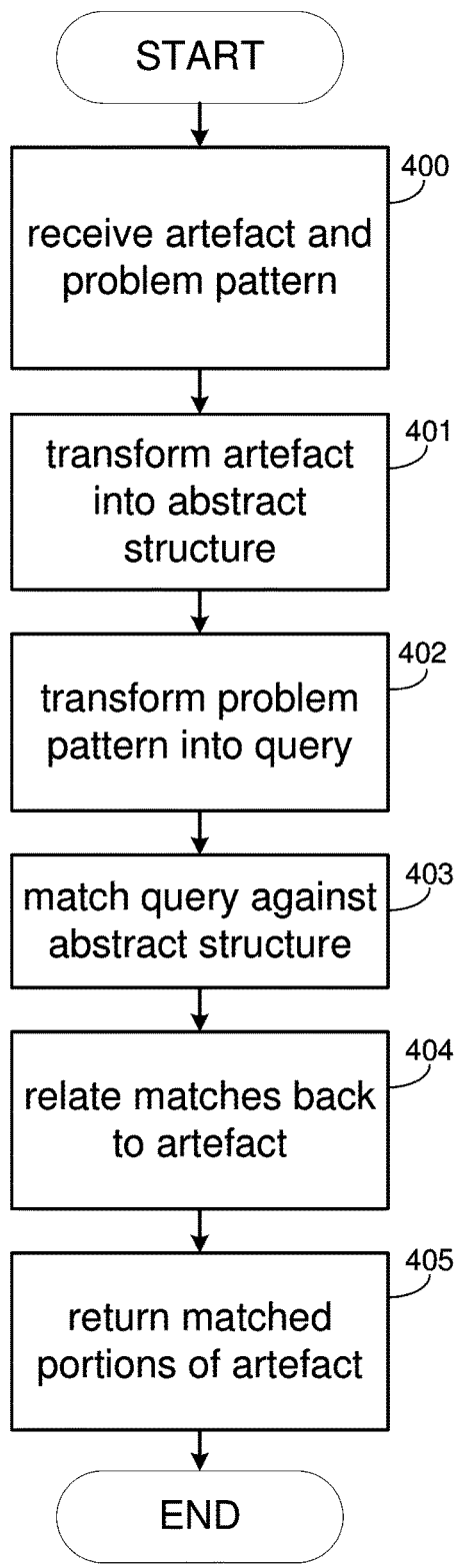
FIG. 4 is a flow chart diagram showing various operational steps of the problem determination program according to at least one embodiment of the invention.

Referring now to the flow chart diagram of FIG. 4, in accordance with at least one embodiment of the invention. At step 400 of the method according to the depicted embodiment, the problem determination program 101 receives the artefact 102 and problem pattern 103. At step 401, the problem determination program 101 transforms the artefact 102 into the abstracted artefact structure 311. At step 402, the problem determination program 101 transforms the problem pattern 103 into a query 310. At step 403, the problem determination program 101 matches the query 310 against the abstracted artefact structure 311. Matching the query 310 against the abstracted artefact structure 311 may be accomplished by traversing hierarchical features of the abstracted artefact structure 310, as described more fully below, or, more generally, by any search algorithm. At step 404, the problem determination program 101 relates any matched portions 312 of the abstracted artefact structure 311 back to corresponding result portions 304 of the artefact 102. At step 405, the problem determination program 101 returns the corresponding result portions 304 of the artefact 102.

The transformations of steps 401 and 402 may be made such that the abstracted artefact structure 311 can be queried or is traversable, in particular according to the query 310. Specifically, the artefact 102 may be transformed so as to be expressed in Resource Description Framework (RDF) or other traversable structure. RDF is a standard maintained by the World Wide Web Consortium (W3C); generically, a "resource description framework" may be any data structure whose properties are similar to that of RDF. In particular, the RDF standard permits resources both to share predicates and relationships and to have their own unique ones. Using an externally imposed framework of predicates and relationships, the abstracted artefact structure 311 can represent hierarchical relationships within the artefact 102. For example RDF relationships and predicates can model the input and output streams of various LOLEPOPS where the artefact 102 is a RDBMS query plan.

Where the abstracted artefact structure 311 is expressed in a resource description framework, it may be directly queried at the application level of the problem determination program 101 via query expressed in a resource description framework query language. More specifically, the SPARQL Protocol and RDF Query Language (SPARQL) (also a standard maintained by the W3C) provides a means of directly querying RDF data. Thus, the problem determination program may accomplish step 402 by expressing the query 310 in SPARQL (directed to RDF) or a resource description framework query language directed to a different or generic resource description framework. In such embodiments, step 403 is effected by directly executing the query 310 against the abstracted artefact structure 311 using any standardcompliant implementation of RDF and SPARQL, or a generic resource description framework and a corresponding resource description framework query language.

Figure 5:
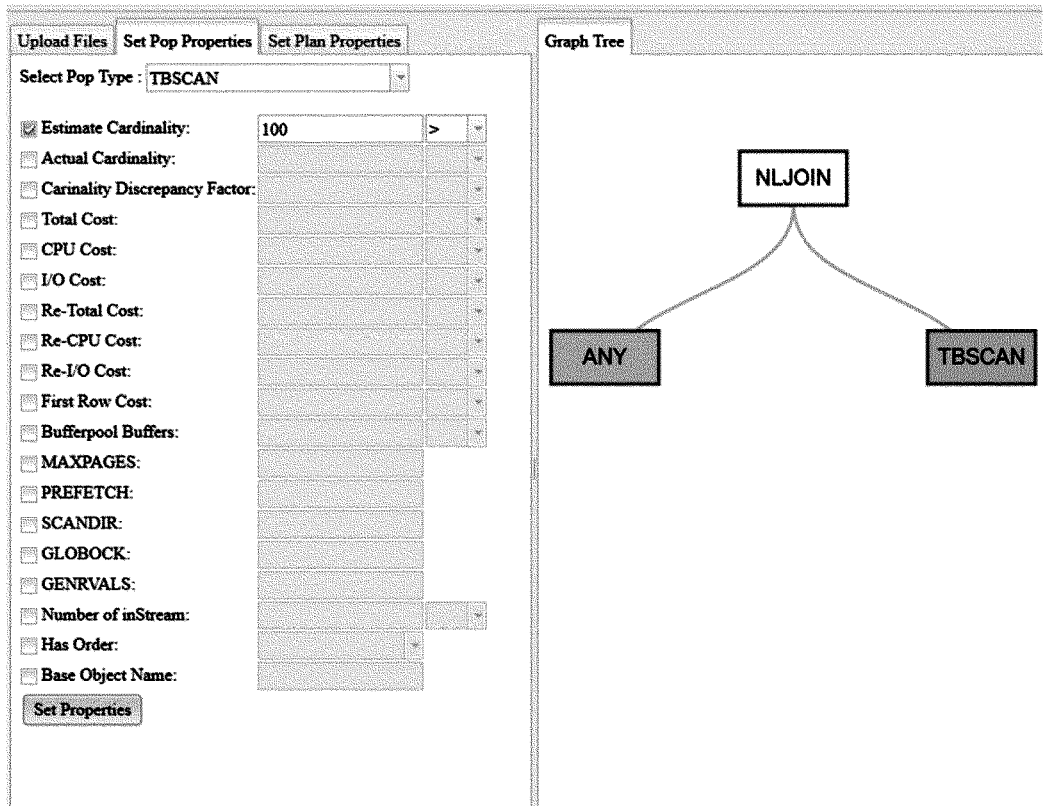
FIG. 5 is a representation of a graphical user interface in accordance with at least one embodiment of the invention.

FIGS. 5-8 display aspects of a worked example in accordance with at least one embodiment of the invention. FIG. 5 displays an exemplary graphical user interface wherein a user can express the problem pattern 103 by selecting various properties of LOLEPOPS that a user might be interested in within an RDBMS query plan. In the depicted example, the user is concerned with LOLEPOPS that: (i) are of type Nested Loop Join (NLJOIN); (ii) have an outer input stream with cardinality greater than one (meaning that the specified LOLEPOP will be returning more than one row); (iii) have inner input stream of type TaBle Scan (TBSCAN); and (iv) the inner input stream has large cardinality. The depicted graphical user interface generates an example structure of a LOLEPOP that matches the selected properties. In this case, the described LOLEPOP is an NLJOIN of a fetch (FETCH) and a TBSCAN. Such pattern is costly as deduced by satisfying the cardinality conditions: the NLJOIN operator scans the entire table (TBSCAN) for each of the rows from the FETCH. It would likely be of value for a subject matter expert to spend time and attention to try to eliminate this pattern. In this circumstance, the query plan problem determination program 101 would output an expert provided recommendation to create an index of the target table of the TBSCAN.

Figure 6:
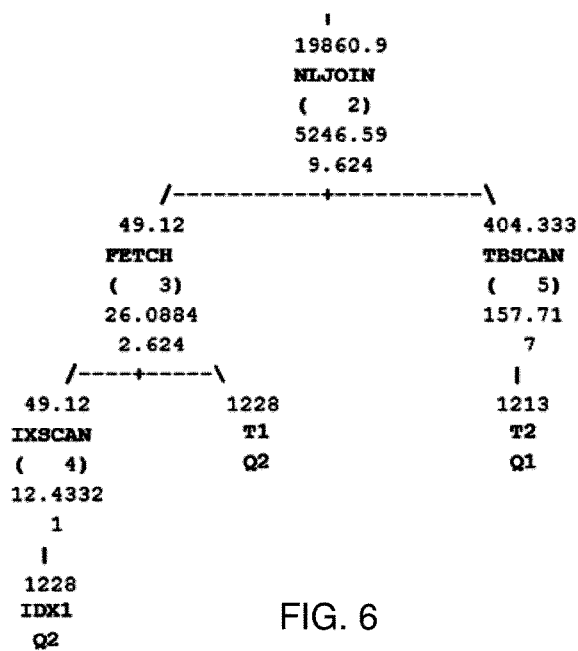
FIG. 6 is a portion of a query execution plan presented as example data in accordance with at least one embodiment of the invention.

FIG. 6 depicts an example query access plan from an RDBMS. In the depicted example, LOLEPOP #2 is an NLJOIN with input streams of LOLEPOP #3 and LOLEPOP #5. Each LOLEPOP has an estimated Input/Output (I/O)

cost (the bottom number) and a cumulative cost for itself and all LOLEPOPS below it (the second from the bottom number). The FETCH at LOLEPOP #3 has a cost of 26.0884 timerons, while the TBSCAN has a cost of 157.71 timerons (timerons are comparable to milliseconds but the cost figures are approximations and are best understood as relative to one another).

FIG. 7 depicts an RDF representation of LOLEPOP #5 of FIG. 6. Each RDF statement is of the form Resource→Predicate→Object. In the depicted code, all statements refer to the resource "http://explainPlan/PlanPop/5", equivalent to LOLEPOP #5. Various predicates are shown, each encoding a piece of information from the query access plan of FIG. 6. For example, there are predicates that specify LOLEPOP #5's total cost (157.71) and estimated cardinality (404.333).

FIG. 8 depicts a SPARQL query that expresses the user preferences shown in the graphical user interface of FIG. 5. The URIs broadly match the RDF of FIG. 7, and the various query limitations match the elements of the problem pattern 103 as indicated by the user through the graphical user interface.

Figure 9:
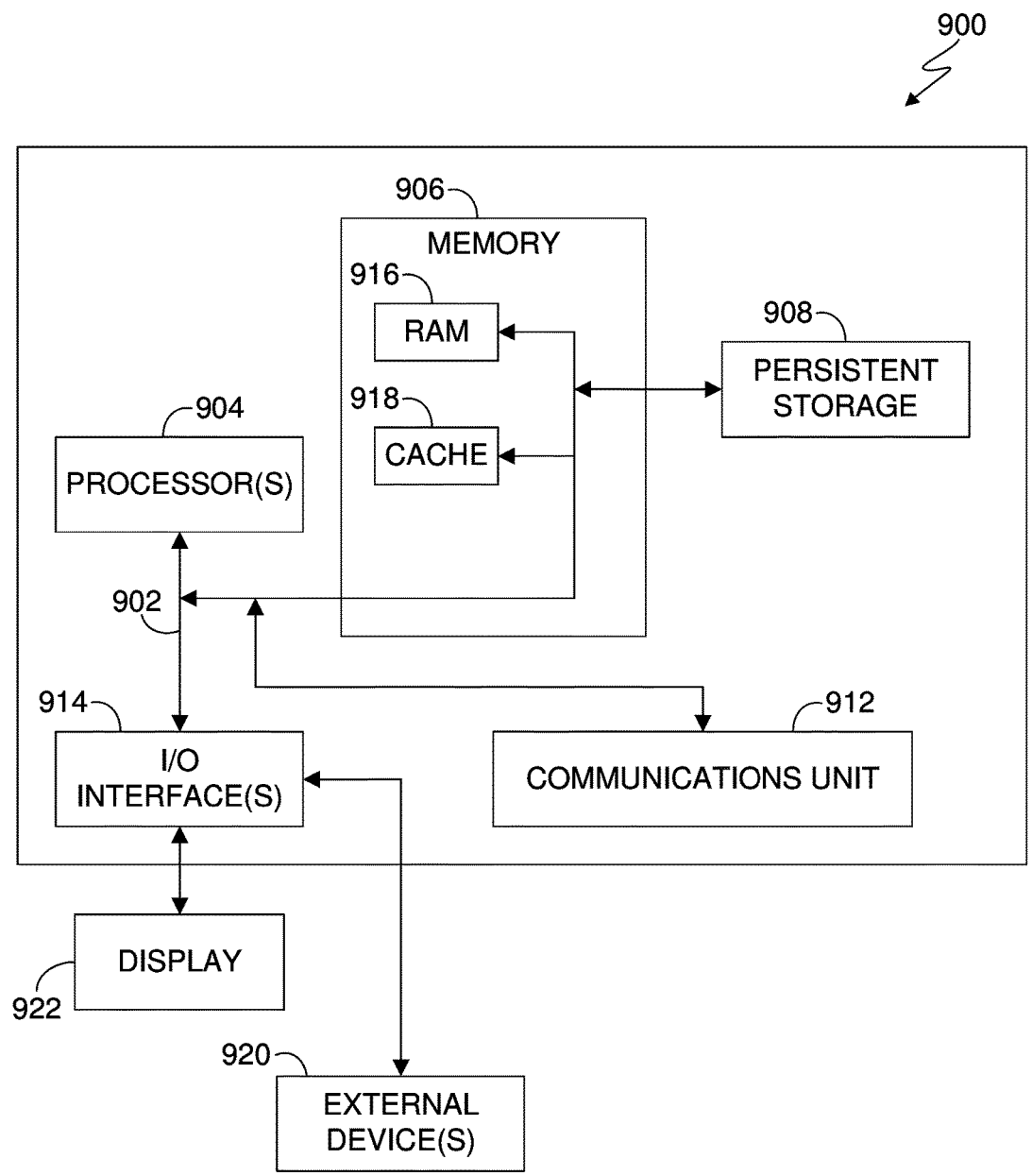
FIG. 9 is a block diagram of one example of a computing apparatus suitable for executing the problem determination program in accordance with at least one embodiment of the invention.

FIG. 9 is a block diagram depicting components of a computer 900 suitable for executing the problem determination program 101. FIG. 9 displays the computer 900, the one or more processor(s) 904 (including one or more computer processors), the communications fabric 902, the memory 906, the RAM 916, the cache 918, the persistent storage 908, the communications unit 912, the I/O interfaces 914, the display 922, and the external devices 920. It should be appreciated that FIG. 9 provides only an illustration of one embodiment and does not imply any limitations with regard to the environments in which different embodiments may be implemented. Many modifications to the depicted environment may be made.

As depicted, the computer 900 operates over a communications fabric 902, which provides communications between the computer processor(s) 904, memory 906, persistent storage 908, communications unit 912, and input/output (I/O) interface(s) 914. The communications fabric 902 may be implemented with any architecture suitable for passing data or control information between the processors 904 (e.g. microprocessors, communications processors, and network processors), the memory 906, the external devices 920, and any other hardware components within a system. For example, the communications fabric 902 may be implemented with one or more buses.

The memory 906 and persistent storage 908 are computer readable storage media. In the depicted embodiment, the memory 906 comprises a random access memory (RAM) 916 and a cache 918. In general, the memory 906 may comprise any suitable volatile or non-volatile one or more computer readable storage media.

Program instructions for the problem determination program 101 may be stored in the persistent storage 908, or more generally, any computer readable storage media, for execution by one or more of the respective computer processors 904 via one or more memories of the memory 906. The persistent storage 908 may be a magnetic hard disk drive, a solid state disk drive, a semiconductor storage device, read-only memory (ROM), electronically erasable programmable read-only memory (EEPROM), flash memory, or any other computer readable storage media that is capable of storing program instructions or digital information.

The media used by the persistent storage 908 may also be removable. For example, a removable hard drive may be used for persistent storage 908. Other examples include optical and magnetic disks, thumb drives, and smart cards that are inserted into a drive for transfer onto another computer readable storage medium that is also part of the persistent storage 908.

The communications unit 912, in these examples, provides for communications with other data processing systems or devices. In these examples, the communications unit 912 may comprise one or more network interface cards. The communications unit 912 may provide communications through the use of either or both physical and wireless communications links. In the context of some embodiments of the present invention, the source of the various input data may be physically remote to the computer 900 such that the input data may be received and the output similarly transmitted via the communications unit 912.

The I/O interface(s) 914 allow for input and output of data with other devices that may operate in conjunction with the computer 900. For example, the I/O interface 914 may provide a connection to the external devices 920, which may be as a keyboard, keypad, a touch screen, or other suitable input devices. External devices 920 may also include portable computer readable storage media, for example thumb drives, portable optical or magnetic disks, and memory cards. Software and data used to practice embodiments of the present invention may be stored on such portable computer readable storage media and may be loaded onto the persistent storage 908 via the I/O interface(s) 914. The I/O interface(s) 914 may similarly connect to a display 922. The display 922 provides a mechanism to display data to a user and may be, for example, a computer monitor.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of computer program instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method comprising:
   receiving an artefact in the form of computer readable data corresponding to a query execution plan for accessing a database management system, with the query execution plan including a plurality of LOw LEvel Plan OPeratorS (LOLEPOPS), and with each LOLEPOP of the plurality of LOLEPOPS respectively corresponding to an indivisible operation that is directly executed by the database management system;
   transforming the query execution plan into a Resource Description Framework (RDF) data structure including RDF relationships and predicates that model input and output streams of the LOLEPOPS of the plurality of LOLEPOPS of the query execution plan;
   receiving a problem pattern data set including a plurality of LOLEPOPS related property values respectively corresponding to a plurality of LOLEPOP related parameters;
   determining a match portion of the RDF data structure that match the plurality of LOLEPOPS related property values respectively corresponding to the plurality of LOLEPOP related parameters; and
   returning a result portion of the query execution plan corresponding to the match portion of the RDF data structure.

2. The method of claim 1 wherein the LOLEPOP related parameters include at least one of the following: estimate cardinality, actual cardinality and/or cardinality discrepancy factor.

3. The method of claim 1 wherein the LOLEPOP related parameters include at least one cost factor.

4. The method of claim 1 wherein the LOLEPOP related parameters include at least one of the following: bufferpool buffers, MAXPAGES, PREFETCH, SCANDIR, GLOBLOCK, GENRVALS.

5. The method of claim 1 wherein the LOLEPOP related parameters include at least one of the following: number of inSteam, has order and base object name.

\* \* \* \* \*